US007187861B2

(12) United States Patent
Ruchet

(10) Patent No.: US 7,187,861 B2
(45) Date of Patent: Mar. 6, 2007

(54) METHOD AND APPARATUS FOR TESTING OPTICAL NETWORKS

(75) Inventor: Bernard Ruchet, Charlesbourg (CA)

(73) Assignee: EXFO Electro-Optical Engineering Inc., Quebec (CA)

( * ) Notice: Subject to any disclaimer, the term of this patent is extended or adjusted under 35 U.S.C. 154(b) by 0 days.

(21) Appl. No.: 10/538,768

(22) PCT Filed: Aug. 23, 2004

(86) PCT No.: PCT/CA2004/001552

§ 371 (c)(1),
(2), (4) Date: Jun. 10, 2005

(87) PCT Pub. No.: WO2005/036783

PCT Pub. Date: Apr. 21, 2005

(65) Prior Publication Data

US 2006/0171711 A1   Aug. 3, 2006

Related U.S. Application Data

(60) Provisional application No. 60/511,105, filed on Oct. 15, 2003.

(51) Int. Cl.
*H04B 10/08* (2006.01)
*H04B 17/00* (2006.01)
*G01N 21/00* (2006.01)

(52) U.S. Cl. .............................. 398/9; 398/25; 398/31; 356/73.1

(58) Field of Classification Search ............. 398/9, 398/25, 33, 38, 31, 30, 26, 16; 356/73.1, 356/477, 482
See application file for complete search history.

(56) References Cited

U.S. PATENT DOCUMENTS 5,535,038 A * 7/1996 Hinch .................... 398/182
5,696,707 A * 12/1997 Hentschel et al. ........... 702/69
6,188,509 B1 * 2/2001 Lee et al. ............... 359/341.2
6,600,594 B1 * 7/2003 Ko et al. ................. 359/337

FOREIGN PATENT DOCUMENTS

EP          WO 99/67609    * 12/1999

* cited by examiner

Primary Examiner—M. R. Sedighian
(74) Attorney, Agent, or Firm—Thomas Adams

(57) ABSTRACT

An instrument for measuring bidirectional optical signals propagating in an optical transmission path between elements one of which will not transmit if continuity of the transmission path is not maintained, for example a branch path between a central offices optical line terminal (OLT) and an end-user's optical network terminal (ONT), comprises first and second connector receptacles for connecting the instrument into the path, a 2×2 coupler (32) having first and second ports (28, 30) connected to the first and second connectors (22, 24), respectively, for completing the optical transmission path, a third port (36) for, outputting a portion of each optical signal received via the first port (28) and a fourth port (34) for outputting a portion of each optical signal received via the second port (30) Detectors (38, 42, 44) coupled to the third and fourth ports convert the optical signal portions into corresponding electrical signals, which are processed to provide the desired measurements. The measurement results may be displayed by a suitable display unit (60) Where the OLT transmits signals at two different wavelengths, the instrument may separate parts of the corresponding optical signal portion according to wavelength and process them separately.

29 Claims, 2 Drawing Sheets

METHOD AND APPARATUS FOR TESTING OPTICAL NETWORKS

CROSS-REFERENCE TO RELATED APPLICATION

This application claims priority from U.S. Provisional patent application No. 60/511,105 filed Oct. 15, 2003, the entire contents of which are incorporated herein by reference.

FIELD OF THE INVENTION

The invention relates to a method and apparatus for testing optical networks and is especially, but not exclusively, applicable to a method and apparatus for measuring signals in optical transmission lines of passive optical networks.

BACKGROUND ART

As the cost of optical fiber and associated components decreases, new telecommunications network deployments increasingly use optical fiber from the edge of a core network to a location at or very close to the end user. Such so-called FTTX (Fiber-to-the-X; where X is the home, the office, the building the curb, etc.) installations are usually based on a passive optical network (PON) architecture, where a terminal at the core-network edge (Optical Line Terminal—OLT) broadcasts signals downstream along an fiber-optic cable to a N-port splitter, and each of the ports then terminates at an optical network terminal (ONT) located at a respective-one of the end users' premises. Typically, downstream signals are at either of two wavelengths, vis. 1490 nm for the downstream transmission of digital data and 1550 nm for the transmission of cable television (CATV) signals, while each end user's optical network terminal (ONT) transmits upstream data signals at a wavelength of approximately 1310 nm It should be noted that the CATV signals are often transmitted in analog format.

An asynchronous transfer node (ATM) or similar protocol is often used to encode the downstream and upstream data signals, The OLT includes in the downstream 1490-nm signals synchronization signals which permit each of the ONTs to send its upstream (1310-nm) signals in its own unique time slot so as to avoid interference with signals from other ONTs connected on the PON. For this reason, as well as for reasons of eye safety, there is no 1310-nm transmission from ONT's when the fiber link is disconnected, thereby preventing reception of the 1490-nm downstream-data signal Field maintenance of such FTTX installations requires low-cost and easy-to-use diagnostic test instruments to measure the signals. An example of such diagnostic test instruments is an optical power meter that can independently measure the power at the distinct downstream and upstream signal wavelengths (e.g. 1310 nm, 1490 nm, 1550 nm). During a repair call, the results of such a measurement could indicate the source of possible trouble in the network or in the end-user's connection. It is also known to use optical spectrum analyzers (OSA) to measure optical power at several wavelengths at the same time.

A disadvantage of each of these instruments is that it is a one-port device that only measures the power if the signals at the different wavelengths are propagating in the same direction along the fiber In the case of the OSA a further disadvantage is that the instrument is generally much too costly and complicated for routine field applications.

DISCLOSURE OF THE INVENTION

The present invention seeks to eliminate, or at least mitigate, the disadvantages of the prior art, or at least provide an alternative and, to this end, there is provided a portable instrument for measuring parameters, e.g. optical power, of analog or digital optical signals that concurrently are propagating bi-directionally in an optical transmission path between two elements, such as network elements of a passive optical network, at least one of which will not transmit its optical signals if continuity of the path is not maintained.

According to one aspect of the present invention, there is provided portable apparatus for measuring parameters of optical signals propagating concurrently in opposite directions in an optical transmission path between two elements, at least one of the elements being operative to transmit a first optical signal (S1) only if it continues to receive a second optical signal (S2) from the other of said elements. The apparatus comprises first and second connector means for connecting the instrument apparatus into the optical transmission path in series therewith, and means connected between the first and second connector means for propagating at least said second optical signal (S2) towards said at least one of the elements, and measuring said parameters of said concurrently propagating optical signals (S1, S2).

Where said one of the elements also receives via said optical transmission path a third optical signal (S3) at a different wavelength from that of said second optical signal (S2), the propagating and measuring means may further comprise means for measuring parameters of the third optical signal (S3).

The propagating and measuring means may provide an optical signal path between the first and second connector means for conveying at least a portion of said second optical signal (S2), therethrough for subsequent propagation to the respective one of the elements.

In embodiments of the invention which provide an optical path between the first and second connector means, the propagating and measuring means may comprise:

coupler means having first and second ports connected to the first and second connector means, respectively, and providing said optical signal path to convey a first portion to said first optical signal (S1) and second (S2) optical signal in opposite directions between said first and second connector means, the coupler means having a third port for outputting a second portion (S1') of said first optical signal (S1), detection means for converting (at least) the portion of first optical signal portion into a corresponding electrical signal, and p1 measuring means for processing the electrical signal to provide an indication of said measured parameters The coupler means may have a fourth port for outputting a portion of said second optical signal (S2), the detection means converting the second optical signal portion into a corresponding second electrical signal, and the measuring means processing both of the electrical signals to provide desired measurement values of parameters for each of the counter-propagating signals.

Where said one of the elements also normally receives via the optical transmission path a third optical signal (S3) at a different wavelength to that of said second optical signal (S2), the propagating and measuring means may further comprise means connected to the coupler means for splitting the corresponding optical signal portion into two parts, each part comprising portions of both the second and third optical signals, and separating the two parts according to wavelength before supplying same to said detection means. The detection means may then comprise separate detectors.

The means for splitting and separating may comprise a splitter connected to the coupler for splitting the optical signal portion into two parts and filter means for separating the two parts according to wavelength.

Alternatively, the means for splitting and separating may comprise a wavelength discriminator, for example a wavelength division multiplexer connected to the coupler means for separating the second and third optical signals (S2, S3) according to wavelength before supplying same to said detection means.

The apparatus may comprise display means for displaying measured values of the parameters. Where at least one of the optical signals comprises parts having different arranged to extract the time-averaged optical power of the signal.

Where the optical signals comprise bursts alternating with lulls, the processing means may be arranged to extract the optical power of the bursts If the optical signals comprise bursty digital signals, the processing means may further be arranged to the extract the optical power of the bursts averaged over the duration of the burst. More particularly, where the instrument is to be used for measuring power of optical signals comprised of "bursty" data streams (such as the ATM data signals), the detector means may be arranged to extract the power only from the data bursts and not from any intervening series of digital zeros (i.e. lack of signal). Such bursty data streams are typical of both the upstream data sent by an optical network terminal (ONT) to a plurality of optical line terminals (OLTs) of a passive optical network (PON), and by the OLT to the plurality of ONTs.

The signal processing means may be custom circuitry and/or a suitably-programmed microcomputer According to a second aspect of the invention, there is provided a method of measuring parameters of optical signals propagating concurrently in opposite directions in an optical transmission path between elements, at least one of the elements not transmitting its optical signals (S1) if it ceases to receive signals (S2) from the other of the elements, the method comprising the steps of(i) connecting into the optical transmission path first and second connectors of an apparatus for propagating at least a portion of the second optical signal (S2) to the one element, (ii) extracting a portion of a said first optical signal (S1) and providing a corresponding first electrical signal; and (iii) processing said first electrical signal to provide desired parameter measurements.

The step of propagating at least a portion of the second signal (S2) may include the step of connecting coupler means into the optical transmission path so as to provide an optical path through the apparatus and extracting the portion of the second optical signal from a port of the coupler means.

Where at least one of the optical signal portions comprises parts having different wavelengths, the method may further comprise the step of distinguishing the corresponding different parts of the corresponding optical signal portion according to wavelength, and the detecting and measuring steps then may detect and measure the two different signal parts separately to provide the measured parameters for each signal.

The step of distinguishing the parts may be performed by splitting the portion of the optical signal into two parts and separating the two parts according to wavelength using, for example, filter means.

Alternatively, the step of distinguishing the parts may be performed using a wavelength discriminator, for example a wavelength division multiplexer.

Where the optical signals are analog, the measurement step may extract the time-averaged optical power of the signal.

Where the optical signals comprise bursts alternating with lulls, the measuring step may extract the optical power of the bursts.

If the optical signals comprise bursty digital signals, the measuring step may extract the optical power of the bursts averaged over the duration of the burst. More particularly, where the instrument is to be used for measuring power of optical signals comprised of "bursty" data streams (such as the ATM data signals), the measuring step may extract the power only from the data bursts and not from any intervening series of digital zeros (i.e. lack of signal).

Where at least one of the optical signals comprises parts having different wavelengths, the method may further comprise the step of distinguishing the corresponding different parts of the corresponding optical signal portion according to wavelength, and the detecting and processing steps then may detect amid process the two different signal parts separately Various objects, features, aspects and advantages of the present invention will become more apparent from the following detailed description, of a preferred embodiment of the invention which is described by way of example only with reference to the accompanying drawings.

DESCRIPTION OF PREFERRED EMBODIMENTS

Figure 1:
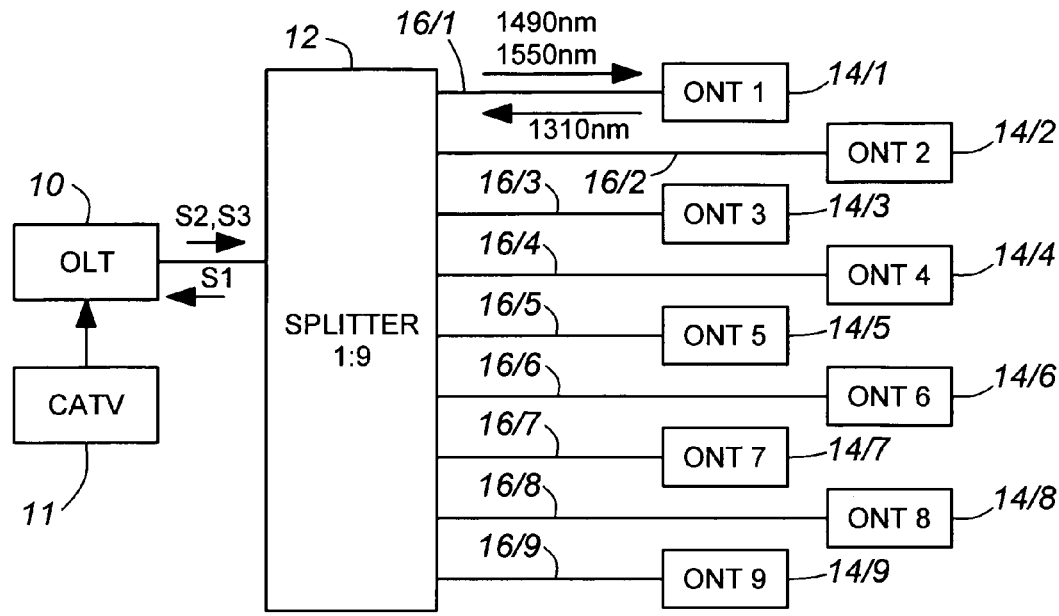
FIG. 1 is a simplified block schematic diagram of a portion of a passive optical network.

A portion of a passive optical network shown in FIG. 1 comprises a first element in the form of a central office optical line terminal (OLT) 10 coupled by a 1:9 splitter 12 to a plurality of other elements in the form of optical network terminals (ONT) 14/1 to 14/9, each coupled to a respective one of the nine ports of the splitter 12 by one of a corresponding plurality of optical waveguides 16/1 to 16/9. (It should be noted that, although nine terminals and a nine-port splitter are shown for convenience of illustration, there could be more or fewer in practice.) The terminals use asynchronous transfer mode (ATM) or similar protocol to encode the downstream (OLT to ONTs) and upstream (ONTs to OLT) digital data signals. OLT 10 broadcasts to the ONTs 14/1 to 14/9 downstream data signals (S2) at a wavelength of 1490-nm and downstream cable television (CATV) signals (S3) at a wavelength of 1550-nm and, in known manner, encodes the 1490-nm signals for synchronization purposes, the encoding being decoded by the ONTs and used to permit each of the ONTs 14/1 to 14/9 to send upstream, to the OLT 10, 1310-nm digital optical data signals (S1) in its own unique time slot so as to avoid interference with signals from other ONTs connected to the same OLT 10. The cable television signals (S3) are supplied by CATV source 11 shown connected to the OLT 10 and combined with the data signals (S2) in known manner.

If they do not receive the downstream signals, and hence the synchronization information, the ONTs cannot normally transmit. For a field technician to make measurements of all three signals, therefore, it is necessary for the ONTs 14/1 to 14/9 to continue receiving the downstream signals from the OLT 10.

Figure 2:
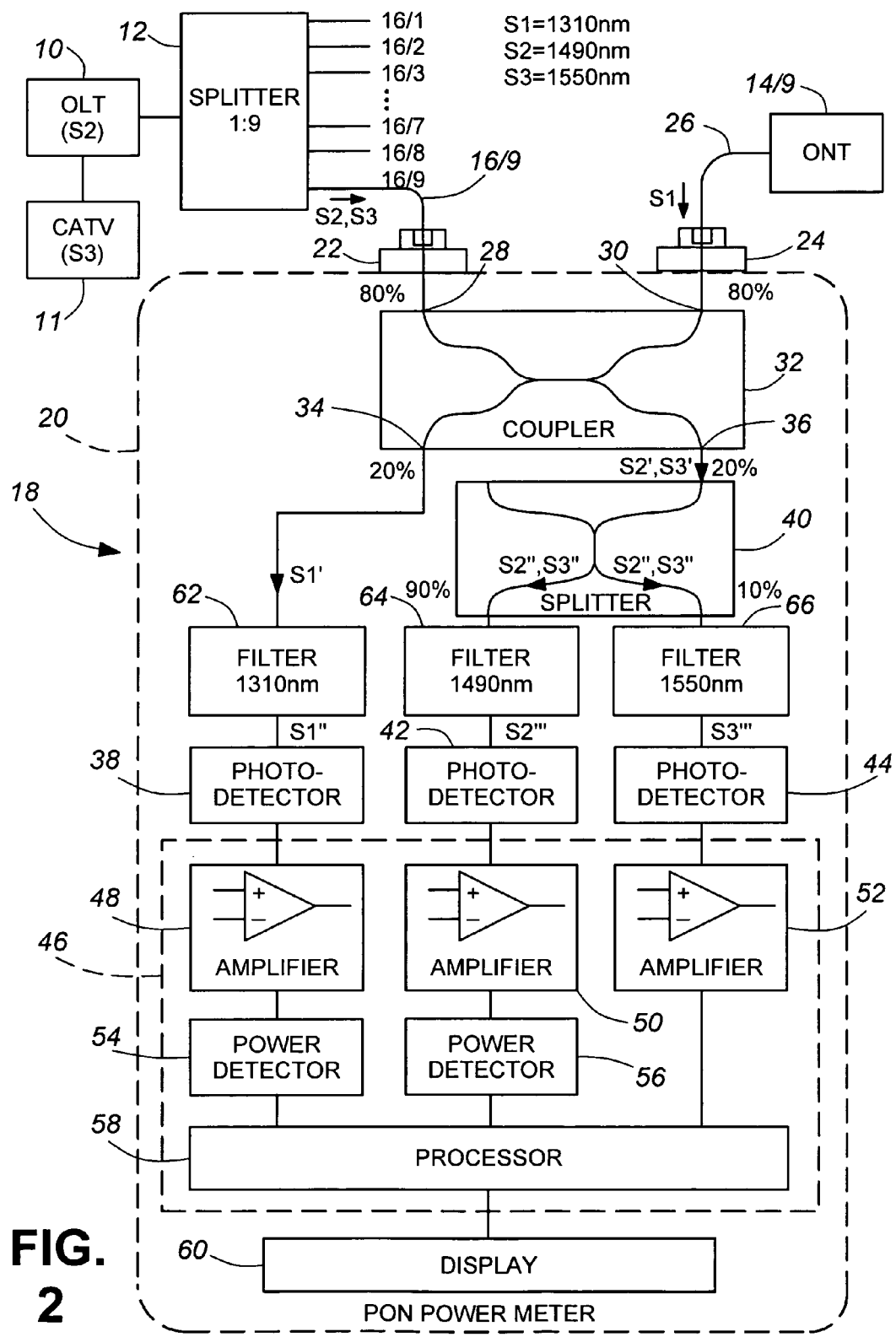
FIG. 2 is a simplified block schematic diagram of a power meter embodying the present invention inserted into a branch of the network.

A test instrument 18 which allows the upstream and downstream optical signals to continue propagating, while measuring the power of the optical signals S1, S2 and S3 at all three wavelengths, will now be described with reference to FIG. 2, which shows the instrument 18 connected into branch waveguide 16/9 between the splitter 12 and ONT 14/9. The test instrument 18 comprises a casing 20 having first 22 and second 24 bulkhead connector receptacles or ports shown coupled to the splitter 12 and ONT 14/9, respectively, connector receptacle 24 being connected to the ONT 14/9 by a short jumper 26.

Within the power meter casing 22, the receptacles 22 and 24 are connected to first and second ports 28 and 30, respectively, of a 2×2 optical coupler 32, having an approximately 80:20 splitting ratio which ratio is approximately the same at all the wavelengths to be measured (i.e. 1310 nm, 1490 nm, 1550 nm).

Thus, coupler 32 splits each of the signals S2, S3 and S1 signal received at ports 28 and 30, respectively, into two parts with a ratio of 80:20. The 80 per cent signal portions are each routed back to the other of the two connectors 22 and 24 while the 20 percent signal portions S1' and S2'. S3' are each routed to one of the corresponding third and fourth ports 34 and 36, respectively, of the coupler 32.

Port 34, which receives the 20 percent portion S1' of the signal S1 from the ONT 14/9, is connected by way of a filter 62, conveniently a 1310 nm bandpass filter, to a first photodetector 38 for detecting light at wavelengths nominally at 1310 nm. Port 36, which receives signal portions S2', S3' representing 20 percent of each of the 1490-nm and 1550-nm optical signals from the OLT 10, is coupled to a 1×2 optical splitter 40, having an approximately 90:10 splitting ratio that is approximately the same at all downstream wavelengths to be measured (i.e. 1490 nm, 1550 nm).

The 90 percent signal portions S2" from splitter 40 are routed via the corresponding output optical fiber from the optical splitter 40 to a second bandpass filter 64, passing light within an approximately 15-nm wavelength band centered about 1490 nm and substantially attenuating light outside of this band (e.g. attenuation of greater than 40 dB at 1550 nm for digital CATV signals). The output S''' of the second bandpass filter 64 is routed to a second photodetector 42, which detects light nominally at 1490 nm.

The 10 percent signals signal portions S2", S3" from splitter 40 are routed via the corresponding output optical fiber to a third bandpass filter 66, passing light within an approximately 25-nm wavelength band centered about approximately 1550 nm and substantially attenuating light outside of this band (e.g. greater than 20 dB for analog CATV signals, greater than 40 dB for digital CATV signals). The output S3''' of the third bandpass filter 66 is coupled to the third photodetector 44, which detects light nominally at 1550 nm.

The three photodetectors 38, 42 and 44 supply their corresponding electrical signals to an electronic measuring unit 46 which comprises a set of three similar amplifiers 48, 50 and 52 for amplifying the electrical signals from photodetectors 38,42 and 44, respectively. Power detectors 54 and 56 detect power of the amplified electrical signals from amplifiers 48 and 50, respectively, and supply the power measurements to a processor unit 58 which, using an internal analog-to-digital converter, converts them to corresponding digital signals which it processes to obtain the required parameter measurements, specifically power, and supplies the measurement information to a display unit 60 for display of the measurements in a conventional manner. The amplified signal from amplifier 52, corresponding to CATV signal S3, is supplied directly to the measurement unit 58, to provide a measure of average optical power.

Typically, the field technician will disconnect the link 16/9 to ONT 14/9 at the home/premise etc. of the end-user at an existing "connectorized" coupling. The connector on the upstream part of the link 16/9 will then be connected to a specified one (22) of the two bulkhead connectors on the instrument, and the connector on the jumper 26 will be connected to the other, Of course, if a connectorized coupling between parts of the link is available, the jumper 26 may not be needed.

While the link is disconnected, emission of the upstream data signals at wavelength 1310 nm by the ONT 14/9 will normally cease, and will then recommence when the two connectors are connected to their respective bulkhead connector receptacles 22,24 on the test instrument 18 and the ONT begins to receive the 1490 nm signal again. Measurements can then be taken.

The fact that there will be a temporary disruption in the line as the instrument 18 is inserted is not normally important, since it would normally be used in service calls where a problem has already been indicated by the customer.

Once the test instrument is inserted into the line, between the splitter 12 and the selected one of the ONTs 14/1 to 14/9 (see FIG. 1), 80% portions of the downstream data and video signals S2, S3 (i.e. at 1490 nm and 1550 nm, respectively) will pass directly through to the ONT 14/9. The ONT, thus synchronized via the received data signal, will then be able to emit its upstream i.e. 1310-nm) data signal S1, an 80% portion of which will be sent upstream to the OLT 10, the other 20% portion being diverted to the detector 38.

It will be appreciated that the ratio of the coupler 32 need not be 80.20. Embodiments of the invention may employ different ratios. Generally, lower ratios entail more attenuation while higher ratios are more polarization-dependent. It should he noted however, that preferred couplers are available commercially that have a particular band of wavelengths for which their ratios are substantially wavelength and polarization independent.

It will be appreciated that the invention is not limited to the measurement of optical power and to power meters, but could be applied to the measurement of other parameters, such as optical spectrum, bandwidth utilization in the transmission path or link, and so on. For example, the coupler 32 could be combined with an optical spectrum analyzer (OSA) which would replace the optical splitter 40, the bandpass filters 62, 64, 66, detectors 38, 42 and 44, measuring means 46, and the display 60, and a 2×1 coupler be added to couple the ports 34 and 36 of the 2×2 coupler 32 to the single input port of the OSA, thereby combining the two 20% signal portions.

It will also be appreciated that the 2×1 coupler inherently will introduce a loss, typically of 50% or more. Of course, instead of the OSA, an alternative single-port device coupled to a 2×1 coupler could replace the components 38–66 of FIG. 2.

The bandpass filter 62 serves as a discrimination filter and is desirable to avoid undesired effects caused by optical back reflection of the 1550 nm signal which can be acute when measurements are taken close to the OLT 10. It may be omitted, however, if the apparatus will normally be used close to the ONT terminal(s).

Figure 3:
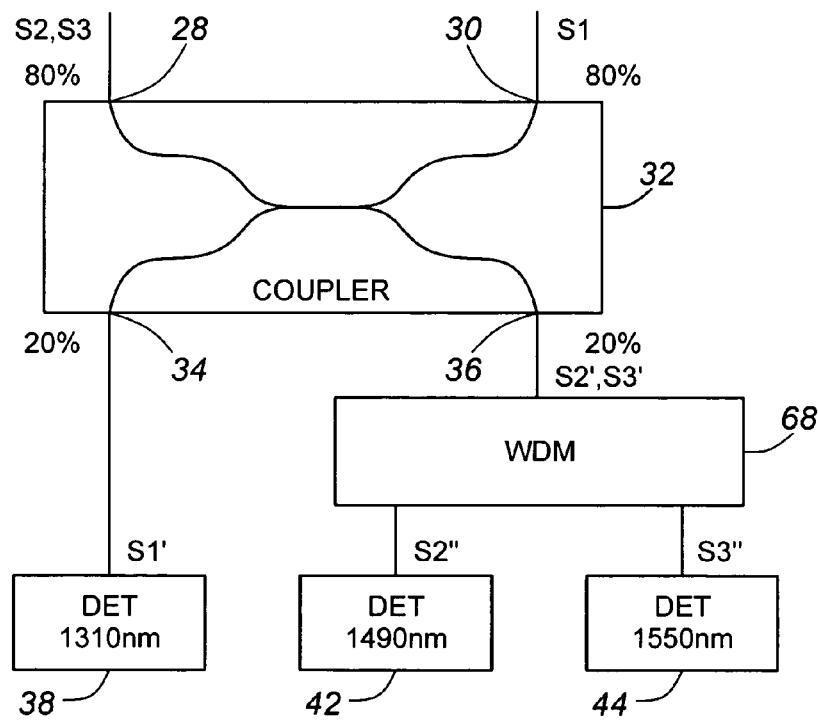
FIG. 3 is a detail view illustrating a modification

As illustrated in FIG. 3, which shows part of a modified instrument 18*, the splitter 40 and bandpass filters 64 and 66 may be replaced by a wavelength demultiplexer 68 (e.g. a low optical crosstalk WDM coupler) which separates the signal portions S2' and S3' according to their respective wavelengths and supplies the separated signals portions S2" and S3" to the detectors 42 and 44, respectively. It will be noted that FIG. 3 omits the bandpass filter 62, but it may be included for the reasons discussed above.

The electronic processing unit 46 may be digital rather than analog, in which case it could be a suitably programmed microcomputer.

INDUSTRIAL APPLICABILITY

Portable test instruments embodying the present invention may be inexpensive and easy-to-use base of-use is especially critical when they are used for testing FTTX networks since the maintenance field technicians are generally the same personnel who maintain wire telephone connections and rarely have had significant training in fiber-optic technology.

Although an embodiment of the invention has been described and illustrated in detail, it is to be clearly understood that the same is by way of illustration and example only and not to be taken by way of the limitation, the spirit and scope of the present invention being limited only by the appended claims.

The invention claimed is:

1. Portable apparatus for measuring parameters of optical signals propagating concurrently in opposite directions in an optical transmission path between two elements at least one of the elements being operative to transmit a first optical signal (S1) only if it continues to receive a second optical signal (S2) from the other of said elements, the apparatus comprising first and second connector means for connecting the apparatus into the optical transmission path in series therewith, and means connected between the first and second connector means for propagating at least said second optical signal (S2) towards said at least one of the elements, and measuring said parameters of said concurrently propagating optical signals (S1, S2).

2. Apparatus according to claim 1, wherein the propagating and measuring means provides an optical signal path between the first and second connector means for conveying at least a portion of said second optical signal (S2).

3. Portable apparatus for measuring parameters of optical signals propagating concurrently in opposite directions in an optical transmission path between two elements), at least one of the elements being operative to transmit a first optical signal (S1) only if it continues to receive a second optical signal (S2) from the other of said elements, the apparatus comprising first and second connector means for connecting the apparatus into the optical transmission path in series therewith, and means) connected between the first and second connector means for propagating at least said second optical signal (S2) towards said at least one of the elements, and measuring said parameters of said concurrently propagating optical signals, (S1, S2)

wherein the propagating and measuring means provides an optical signal path between the first and second connector means for conveying at least a portion of said second optical signals (S1, S2) comprises:

coupler means having first and second ports connected to the first and second connector means, respectively, to provide said optical signal path to convey said first (S1) and second (S2) optical signals in opposite directions between said first and second connector means, and a third port for supplying a portion (S1') of said first optical signal (S1), detection means for converting at least the first optical signal portion (S1') into a corresponding electrical signal, and measuring means for processing the electrical signal to provide an indication of said measured parameters.

4. Apparatus according to claim 3, wherein the coupler means has a fourth port for supplying a portion (S2') of said second optical signal (S2), the detection means also converting at least part of the second optical signal portion (S2') into a corresponding second electrical signal, and the measuring means processing both of the electrical signals to provide desired measurement values of parameters for each of the counter-propagating signals.

5. Apparatus according to claim 1, wherein, where said one of the elements also receives via said optical transmission pat a third optical signal (S3) at a different wavelength from that of said second optical signal (S2), the propagating and measuring means further comprises means for measuring parameters of the third optical signal (S3).

6. Apparatus according to claim 4, wherein, where said one of the elements also normally receives via the optical transmission path a third optical signal (S3) at a different wavelength to that of said second optical signal (S2), the propagating and measuring means further comprises a splitter connected to the coupler means for splitting a corresponding optical signal portion (S2', S3') into two parts (S2", S3"), each comprising portions of both the second and third optical signals, and filter means coupled to the splitter for separating the two parts according to wavelength before supplying same to said detection means.

7. Apparatus according to claim 4, wherein, where said one of the elements also normally receives via the optical transmission path a third optical signal (S3) at a wavelength different from that of said second optical signal (S2), said propagating and measuring means comprises a wavelength discriminator (68) connected to the coupler for separating at least a portion (S2', S3') of the combined second and third optical signals (S2, S3) according to wavelength to obtain corresponding separate portions (S2", S3") and supplying same to said detection means.

8. Apparatus according to claim 1, wherein the measuring means comprises a separate detector for each of the measured optical signal portions.

9. Apparatus according to claim 1, wherein, where one of the optical signals is analog& the measuring means is arranged to extract the time-averaged optical power of the signal.

10. Portable apparatus for measuring parameters of optical signals propagating concurrently in opposite directions in an optical transmission path between two elements, at least one of the elements being operative to transmit a first optical signal (S1) only if it continues to receive a second optical signal (S2) from the other of said element the apparatus comprising first and second connector means for connecting the apparatus into the optical transmission path in series therewith and means connecting between the first and second connector means for propagating at least said second optical signal (S2) towards said at least one of the elements, and measuring said parameters of said concurrently propagating optical signals, wherein, where one (S1) of the optical signals comprises bursts of digital data alternating with lulls, the measuring means is arranged to extract the average of the optical power averaged over the duration of the individual bunts.

11. Apparatus according claim 1, wherein the measuring means comprises custom circuitry.

12. Apparatus according to claim 1, wherein the measuring means comprises a suitably-programmed microcomputer.

13. Apparatus according to claim 1, wherein said measuring means further comprises display means for displaying the parameter measurements.

14. A method of measuring parameters of at least one of optical signals propagating concurrently in opposite directions in an optical transmission path between two elements, at least one of the elements being operative to transmit a first optical signal (S1) only if it continues to receive a second optical signal (S2), the method comprising the steps of:
connecting first and second connector means of portable measuring apparatus into the optical transmission path in series therewith,
using the apparatus to propagate at least said second optical signal (S2) towards said at least one of the elements, and
measuring said parameters of said at least one of the concurrently propagating optical signals.

15. A method according to claim 14, wherein the apparatus provides an optical signal path between the first and second connector means for at least said second optical signal (S2).

16. A method of measuring parameters of at least one of optical signals propagating concurrently in opposite directions in an optical transmission path between two elements, at least one of the elements being operative to transmit a first optical signal (S1') only if it continues to receive a second optical signal (S2'), the method comprising the steps of:
connecting first and second connector means of portable measuring apparatus into the optical transmission path in series therewith,
using the apparatus to propagate at least said second optical signal (S2) towards said at least one of the elements, and
measuring said parameters of said at least one of the concurrently propagating optical signals, wherein the apparatus has a coupler means having first and second ports connected to the first and second connector means, respectively, to provide said optical signal path for conveying said first (S1) and second (S2) optical signals in opposite directions between said first and second connector means, and a third port for a portion (S1') of said first optical signal (S1) propagating in said optical signal path, the apparatus providing an optical signal path between the first and second connector means for at least said second optical signal (S2), the method comprising the steps of:
extracting said portion (S1') of said first optical signal (S1) from said third port of the coupler means,
converting the first optical signal portion (S1') into a corresponding first electrical signal, and processing the first electrical signal to provide an indication of said measured parameters.

17. A method according to claim 16, further comprising the steps of extracting from a fourth port of the coupler a portion (S2') of said second optical signal (S2) propagating in the optical signal path;
converting the second optical signal portion (S2') into a corresponding second electrical signal; and
processing said first and second electrical signals to provide the desired parameters for each of the counter-propagating optical signals.

18. A method according to claim 14, wherein, where said one of the elements also receives via the optical transmission path a third optical signal (S3) at wavelength different from that of said second optical signal (S2), the measuring step also measures parameters of the third optical signal (S3).

19. A method according to claim 17, wherein, where said one of the elements also receives via the optical transmission pat a third optical signal (S3) co-propagating with the said second optical signal (S2) at a wavelength different from that of the said second optical signal (S2), the measuring step includes the steps of splitting a portion of the co-propagating optical signals into two parts, each comprising portions of the second and third optical signals (S2, S3), separating each of the two parts according to wavelength, converting said parts into said second electrical signal and a third electrical signal, respectively, and also processing the third electrical signal to obtain parameters of the third optical signal (S3).

20. A method according to claim 17, wherein, where said one of the elements also receives via the optical transmission path a third optical signal (S3) co-propagating with the said second optical signal (S2) at a wavelength different from that of the said second optical signal (S2), said measuring step employs a wavelength discriminator connected to the coupler for splitting a portion of the co-propagating optical signals into two parts each corresponding to a respective one of the second and third optical signals, converting the parts to said second electrical signal and a third electrical signal, and also processing the third electrical signal to obtain parameters of said third optical signal (S3).

21. A method according to claim 14, wherein the detection step uses a separate detector for each of the measured optical signals.

22. A method according to claim 14, wherein, where one of the optical signals is analog, the step of measuring said parameters derives the time-averaged optical power of the signal.

23. A method of measuring parameters of at least one of optical signals propagating concurrently in opposite directions in an optical transmission path between two element at least one of the elements being operative to transmit a first optical signal (S1) only if it continues to receive a second optical signal (S2), the method comprising dig steps of:
connecting first and second connectors means of portable measuring apparatus into the optical transmission path in series therewith,
using the apparatus to propagate at least said second optical signal (S2) towards said at least one of the elements, and
measuring said parameters of said at least one of the concurrently propagating optical signals, wherein, where the optical signal whose parameters are measured comprises bursts of digital data alternating with lulls, the measuring step derives the average of the optical power of said optical signal averaged over the duration of the individual burst.

24. A method according to claim 14, wherein the step of measuring said parameters is performed using custom circuitry.

25. A method according to claim 14, wherein the step of measuring said parameters is performed using a suitably-programmed microcomputer.

26. A method according to claim 14, further comprising the step of displaying the parameter measurements.

27. A method according to claim 14, wherein the measurements are performed upon optical signals propagating concurrently in opposite directions in an optical transmission pat between network elements in a passive optical network.

28. A method of measuring parameters of at least one of optical communications signals propagating concurrently in opposite directions in an optical transmission path between two optical network elements in an optical network, at least one of the optical network elements being operative to transmit a first optical signal (S1) only if it continues to receive a second optical signal (S2), the method comprising the steps of:

connecting first and second connector means of portable measuring apparatus to respective portions of the optical transmission path to connect the apparatus into the optical transmission path in series therewith, the optical network elements being located at respective distal ends of said transmission path portions, using the apparatus to propagate at least said second optical signal (S2) towards said at least one of the optical network elements, and measuring said parameters of said at least one of the concurrently propagating optical signals.

29. Portable apparatus for measuring parameters of optical communications signals propagating concurrently in opposite directions in an optical transmission path between two optical network elements at least one of the optical network elements being operative to transmit a first optical signal (S1) only if it continues to receive a second optical signal (S2) from the other of said optical network elements, the apparatus comprising first and second connector means for connecting to respective portions of the transmission path to connect the apparatus into the optical transmission path in series therewith, the optical network elements being located at respective distal ends of said transmission pat portions, and means connected between the first and second connector means for propagating at least said second optical signal (S2) towards said at least one of the optical network elements, and measuring said parameters of said at least one of the concurrently propagating optical signals.

* * * * *